J. P. Smith.
Liquid Meter.

N° 91,374. Patented Jun. 15, 1869.

Witnesses.
J. H. Burridge.
Frank S. Alden.

Inventor.
J. P. Smith.

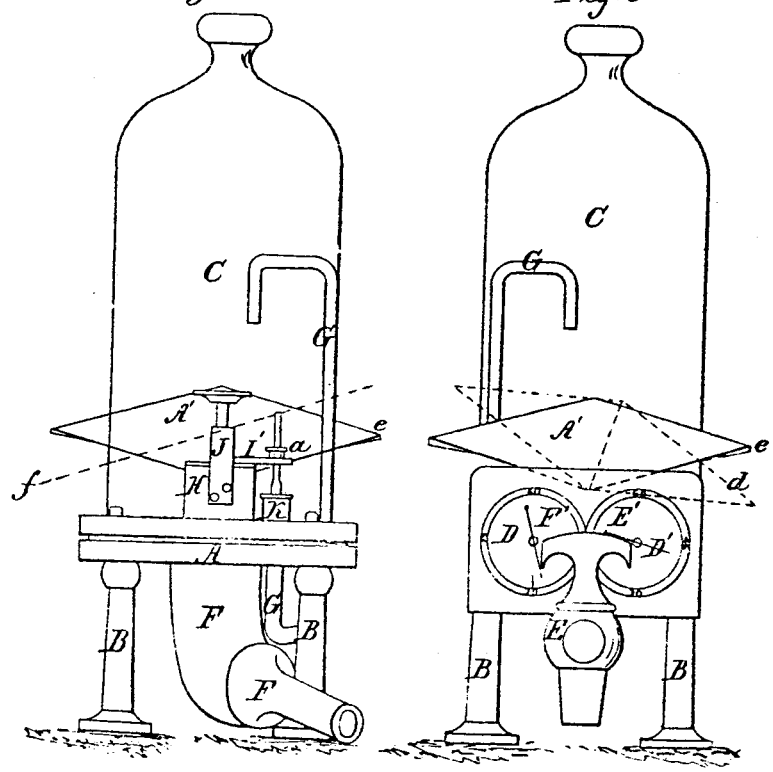

United States Patent Office.

J. PLUMER SMITH, OF CLEVELAND, OHIO.

Letters Patent No. 91,374, dated June 15, 1869.

---

IMPROVEMENT IN LIQUID-METERS.

---

The Schedule referred to in these Letters Patent and making part of the same.

---

*To all whom it may concern:*

Be it known that I, J. PLUMER SMITH, of Cleveland, in the county of Cuyahoga, and State of Ohio, have invented certain new and useful Improvements in Water-Meters; and I do hereby declare that the following is a full and complete description of the same, reference being had to the accompanying drawings, making part of this specification, in which—

Figure 1:
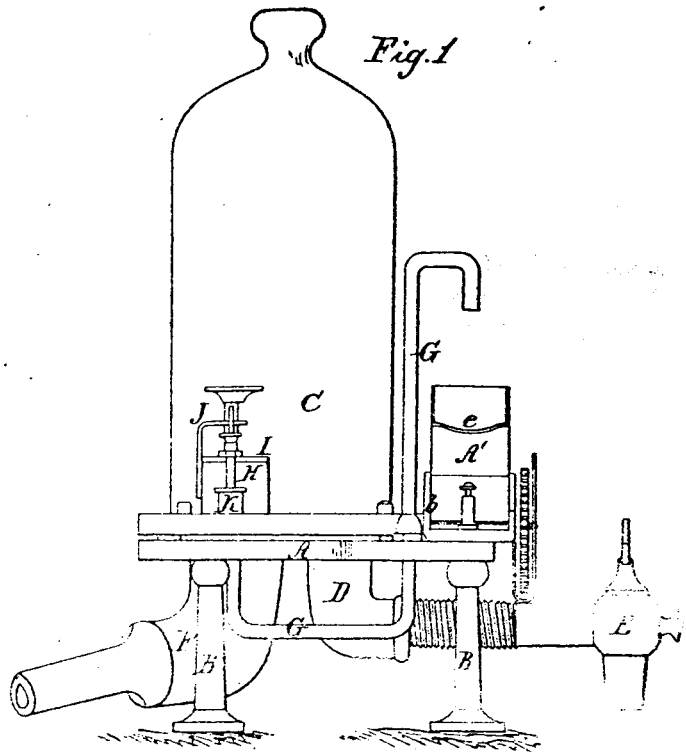
Figure 4:
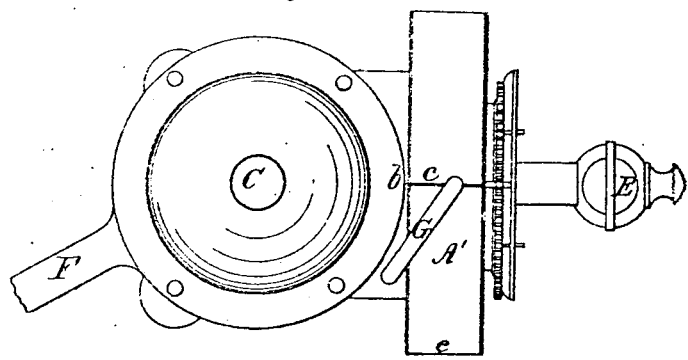

Figure 1, plate 1, is a side view of the meter
Figure 2, an end view.
Figure 3, a view of the opposite side of fig. 2.
Figure 4, plate 2, a top view.
Figure 5, a detached vertical transverse section.
Figure 6, a detached section.

Like letters of reference refer to like parts in the different views.

This invention has for its object the measurement of water and other fluid, and the registering of the same in a manner automatically, by the employment of differential valves, substantially as hereinafter more fully described.

In figs. 1 and 2, A represents a plate or table, mounted upon the standards B.

To said table is secured, in a hermetical manner, the cylinder C, which may be constructed either of glass or metal.

Communicating with said cylinder is an eduction-water pipe, D, provided with a stop-cock, E; also, an induction-pipe, F, and a registering eduction-pipe, G, the purpose of which will hereinafter be shown.

H, fig. 1, a detached view of which is shown in fig. 5, is a valve-chamber, having a direct and open relation to and communicating with the induction-pipe F.

I is the valve, the stem of which is supported by the stay J, thereby guiding and keeping the valve in position while in operation.

K is also a valve-chamber, having an open and direct relation to and communication with the pipe G.

In said chamber is fitted a needle-valve, L, the stem of which is provided with a regulating thumb-screw, a, and supported by an arm, M, to which it is secured, and attached to the valve I, and operated therewith conjointly, as hereinafter shown.

The recording-apparatus connected with the above-described meter consists of the vibratory trough A', pivoted at the points b, on which it oscillates, actuating thereby the wheels B', by means of the pawls C', which in turn move the pointers D', on the dial-plates E', as will hereinafter be shown.

Having thus described the construction and arrangement of the meter, the practical operation of the same is as follows, viz:

The apparatus is attached to the hydrant or reservoir, from which the water or other fluid is to be drawn and measured, the connection being made thereto by the induction-pipe F.

By virtue of the pressure of the water or other fluid, the valve I is opened, allowing the water to flow into the cylinder, from which it escapes by means of the exit or eduction-pipe D, the capacity of which being a little below that of the induction-pipe.

The cylinder will be kept full or partially full, thereby producing an equal and uniform flow of water therefrom, and which is carefully and accurately measured by the needle-valve referred to, and recorded by the register, thus:

Assuming that the valve I has a delivering-capacity of one thousand gallons per day, or hour, and that the capacity of the needle-valve is one gallon for the same time.

This difference in capacity of the two valves, acting conjointly and under equal circumstances as to pressure, will determine the volume of water discharged through the valve I, viz, while the one thousand gallons are running through the valve I, and escaping from the cylinder through the exit-pipe D, the one gallon will escape from the cylinder through the needle-valve, it being opened conjointly with the larger valve.

It will be obvious that this proportional difference in the discharging-capacity of the valves may be varied indefinitely in either direction, as the nature of the circumstances attending the application of the machine may require.

In order to register the number of gallons run through the apparatus, the water passing through the auxiliary or needle-valve is conducted through the pipe G to the vibratory trough A', above referred to, into which it is discharged.

Said trough, as aforesaid, is pivoted at the centre, and is divided at said centre by a partition, c, fig. 4.

The weight of the one gallon of water, discharged into one compartment of the trough, will cause it to descend, as indicated by the dotted line d, fig. 3, thereby operating the pointers upon the dial-plate, moving them from one index-figure to another. The position of the trough is now such that the water discharged therein will run out at the lip e. At the same time water is flowing into the opposite compartment, now under the end of the pipe, to the extent of one gallon, as before, and to the extent of one thousand gallons from the larger pipe D.

At this time the trough will again vibrate, coming to the position as indicated by the dotted line f, fig. 2, thereby operating the pointers by the mechanism of the wheels and pawls, whereby is indicated the second gallon of water discharged into the trough, and a corresponding discharge of a second thousand gallons through the pipe D, and so on as long as the machine is continued to be operated, the valve I discharging one thousand gallons in a given time, and the auxiliary or needle-valve one gallon in the same time, and indicating the same by the register in the manner aforesaid.

By this device, the water or other fluid is accurately measured, and the measurement indicated by one continuous operation.

By changing the size of the auxiliary or needle-valve a, the proportional difference between the two valves can be regulated to any desirable ratio, so that any fractional part of a gallon may be made to represent any number of gallons or barrels discharged by the valve I; hence, in measuring oils or other expensive fluids, less waste, or rather quantity of oil for operating the registering-apparatus will be required, and which may be discharged from the trough into a tube or other vessel, placed underneath, thereby operating the apparatus without loss.

What I claim as my improvement, and desire to secure by Letters Patent, is—

The combination of the valve I and chamber H, as arranged in relation to and with the needle-valve L, and operating conjointly therewith, substantially as and for the purpose set forth.

J. PLUMER SMITH.

Witnesses:
J. H. BURRIDGE,
E. E. WAITE.